United States Patent [19]

Smith

[11] 3,994,199

[45] Nov. 30, 1976

[54] STAY BOLT

[75] Inventor: Mervin L. Smith, Sellersburg, Ind.

[73] Assignee: American Air Filter Company, Inc., Louisville, Ky.

[22] Filed: July 2, 1975

[21] Appl. No.: 592,538

[52] U.S. Cl. .............................. 85/1.5 R; 85/50 C
[51] Int. Cl.² .......................................... F16B 35/00
[58] Field of Search............ 85/1.5 R, 1.5 A, 1.5 H, 85/50 C; 151/38; 122/496

[56] References Cited
UNITED STATES PATENTS

| 757,973 | 4/1904 | Shaffer | 85/1.5 R |
|---|---|---|---|
| 1,304,890 | 5/1919 | Lacerda | 85/1.5 R |
| 1,308,185 | 7/1919 | McKay | 85/1.5 R |
| 1,328,532 | 1/1920 | McKay | 85/1.5 R |
| 1,412,502 | 4/1922 | Andrioli | 85/1.5 R |
| 1,868,084 | 7/1932 | Wheelwright | 85/1.5 R |
| 1,893,017 | 1/1933 | Bruce | 85/1.5 R |
| 1,899,457 | 2/1933 | Einwaechter et al. | 85/1.5 R |
| 2,330,102 | 9/1943 | Yarnall | 151/38 X |

FOREIGN PATENTS OR APPLICATIONS 426,489  3/1926  Germany............................ 85/1.5 R Primary Examiner—Roy D. Frazier
Assistant Examiner—Rodney H. Bonck

[57] ABSTRACT

A stay bolt for utilization with two spaced structural members including an end link attached to one of the members and an eyelet with a threaded stem connected to the end link, the threaded stem extending through an aperture in the other member with means on the end thereof in communication with the other member to permit selected movement between the two spaced structural members in longitudinal and transverse directions.

7 Claims, 1 Drawing Figure

U.S. Patent
Nov. 30, 1976
3,994,199
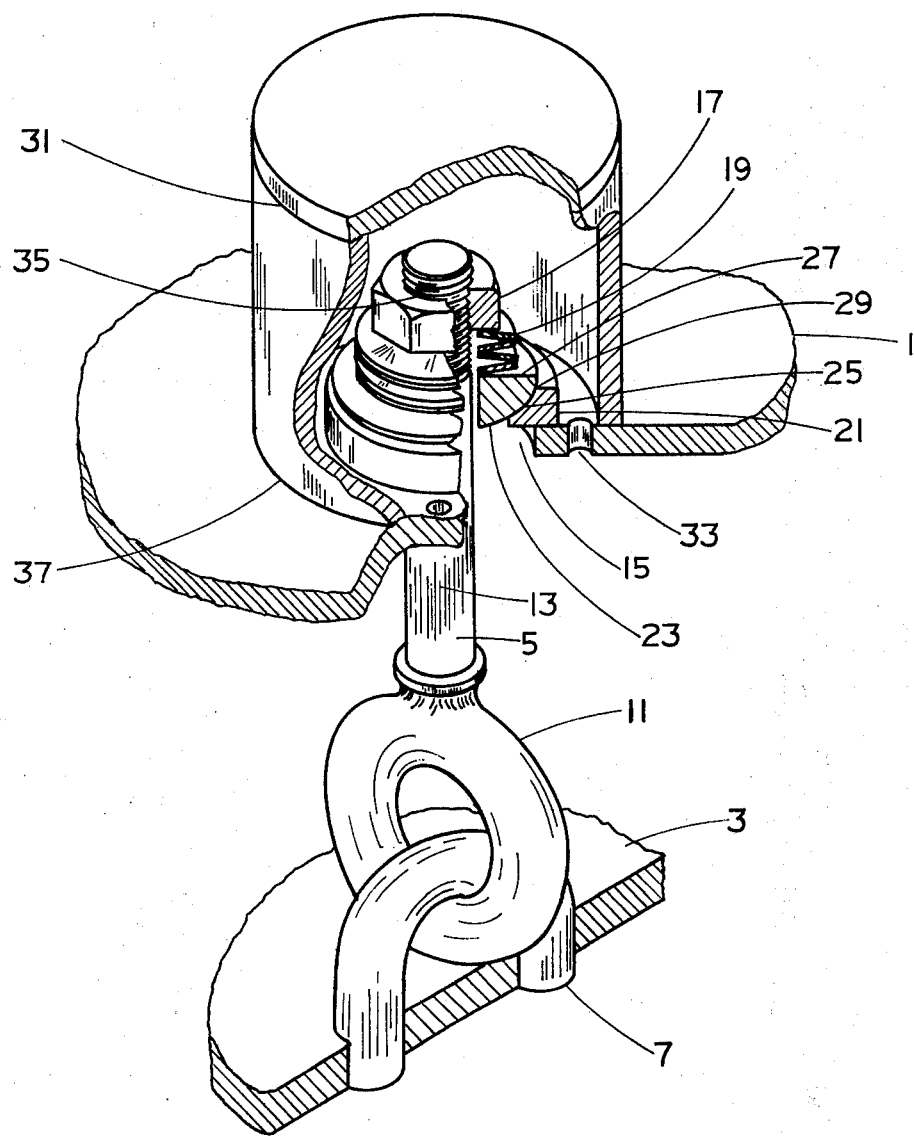

STAY BOLT

BACKGROUND OF THE INVENTION

This invention relates to stay bolts and more particularly to a stay bolt having new, useful, and unobvious means for permitting selected movement between two spaced plate members in longitudinal and transverse directions.

In the art, it is known that rigid stay bolts are subjected to considerable strain and are liable to be bent at their points of union or otherwise rendered inoperative to accomplish the purpose for which they are designed. It is also known in the art, particularly where there is constant contraction and expansion to which two spaced structural members such as plates are subjected, flexible stay bolts have been provided to make up or compensate for some of the constant contraction and expansion. However, in most instances these flexible stay bolts do not permit movement between two plate members in both longitudinal and transverse directions.

SUMMARY OF THE INVENTION

In the present invention, it is recognized that it is desirable to provide a means for permitting differential movement between inner and outer shells of water-cooled ducts in longitudinal and transverse directions and more particularly, it is recognized that it is desirable to provide a stay bolt means for permitting selected differential movement in longitudinal and transverse directions between two spaced structural members.

Various other features of the present invention will become obvious to those skilled in the art upon reading the disclosure set forth hereinafter.

More particularly, the present invention provides in combination with two spaced structural members, a stay bolt comprising: an end link attached to one of the structural members; an eyelet connected to the end link, the eyelet being provided with a stem portion extending through an aperture in the other structural member and including a fastener on the end thereof; a seat surrounding the stem portion and disposed between the other structural member and the fastener; a collar freely mounted on the stem portion and disposed between the seat and the fastener, the collar slidably engaging the seat; and, biasing means freely mounted on the stem portion and disposed between the collar and the fastener.

It is to be understood that the description of the examples of the present invention given hereinafter are not by way of limitation. Various modifications within the scope of the present invention will occur to those skilled in the art upon reading the disclosure set forth hereinafter.

Referring to the drawing:

The FIGURE is a perspective view, partially cutaway, showing a preferred stay bolt of the present invention disposed between two spaced plate members.

Referring to the accompanying drawing, two opposed spaced structural members in the form of plate members 1 and 3, respectively, are attached in spaced relation by a stay bolt 5. The stay bolt 5 comprises, essentially, an end link 7, an eyelet 9, and a threaded stem 13. The end link 7 being of U-shaped configuration is generally welded to the plate member 3 and is connected to eyelet 11, the eyelet 11 fitting closely but loosely with the end link 7. The eyelet 11 is attached to the threaded stem 13 which extends through an aperture 15 in the plate member 1. Threaded stem portion 13 is secured in position by a fastening means, such as nut 17. Disposed between nut 17 and the plate member 1 are a pair of spring washers 19 and a ring 21, it being realized that any number of washers 19 may be used even though only two are shown. The ring 21 is positioned upon the outer side of the plate 1 and is provided with an opening 23 therein, opening 23 being considerably smaller than the aperture 15. The inner rim of this ring 21 is formed with a spherical recess or seat 25 which is matingly engaged by a collar 27 provided with a corresponding spherical shaped outer rim 29 adapted to engage with the seat 25. Collar 27 is slidably mounted upon the stem 13 and is clamped in position by the aforementioned nut 17 with the spring washers 19 being disposed therebetween.

The ring 21, collar 27, spring washers 19, and nut 17 are closed by a suitable cap 31 which is secured to the outer side of the plate member 1 in any preferred manner.

Apertures 33 are provided within the enclosure cap 31 and spaced between the ring 21 and the walls of the cap 31. Apertures 33 are provided for depressurizing the spacing between the spaced members 1 and 3 when the spaced members 1 and 3 are utilized to hold, for example, a fluid, such as water.

From the aforedescribed construction of the stay bolt of the present invention, it is apparent that the stay bolt 5 can readily be applied to unite in spaced relation the plates of, for example, a water-cooled duct wherein the stay bolt 5 can be introduced through the aperture 15 with the end link 7 being welded to the first plate member 3 with the stem 13 passing up through the aperture 15 and plate 1. The stem 13 is then ready to receive ring 21, collar 27, washers 19 and nut 17, nut 17 being tightened down to give a secured seating of the collar 27 in the ring 21. Nut 17 is then secured by a tack weld at the position 35 to prevent movement of the nut 17 during operation. Cap 31 is then placed over the stem 13 including the nut 17, collar 25, ring 21 and is welded to the plate 1 as designated by the numeral 37.

When the parts are in position, it will be seen that there is a flexible connection between the two plates which will permit contraction or expansion of one or the other of the plates without tending to destroy the effectiveness of the bolt. Furthermore, the plates may move in both longitudinal and transverse directions without tending to destroy the effectiveness of the bolt and there will be no substantial lateral or tortional strain upon the bolt which would tend to loosen the joints.

Thus, it will be realized that various changes may be made to the specific embodiment shown and described without departing from the scope and spirit of the present invention.

What is claimed is:

1. In combination with two spaced plate members, a stay bolt comprising:
    an end link attached to a first plate member;
    an eyelet connected to the end link, the eyelet being attached to a stem portion extending through an aperture in a second plate member spaced from said first plate member and including a fastener on the end thereof;
    a seat surrounding the stem portion and disposed between the second plate member and the fastener;

a collar freely mounted on the stem portion and disposed between the seat and the fastener, said collar slidably engaging the seat; and, biasing means freely mounted on the stem portion and disposed between the collar and the fastener whereby said spaced plate members are adaptable for movement relative to each other in both longitudinal and transverse directions.

2. The stay bolt of claim 1 wherein said collar and seat are provided with mating spherical contacting faces.

3. The stay bolt of claim 1, said collar being rotatable in sliding engagement with said seat.

4. The combination of claim 1 including an outer housing surrounding said stay bolt, said housing being attached to and in fluid tight relation with said second plate member.

5. The combination of claim 4 wherein said second plate member includes apertures therein, said apertures being disposed between said seat and said outer housing.

6. The stay bolt of claim 1 wherein said stem portion includes threads on the end thereof and said fastener is a nut.

7. The stay bolt of claim 1, said end link being of U-shaped configuration.

* * * * *